(12) United States Patent
Robinson et al.

(10) Patent No.: US 9,419,457 B2
(45) Date of Patent: Aug. 16, 2016

(54) METHOD AND DEVICE WITH ENHANCED BATTERY CAPACITY SAVINGS

(75) Inventors: James C. Robinson, Lawrenceville, GA (US); Michael G. Hanley, Lawrenceville, GA (US)

(73) Assignee: Google Technology Holdings LLC, Mountain View, CA (US)

( * ) Notice: Subject to any disclaimer, the term of this patent is extended or adjusted under 35 U.S.C. 154(b) by 531 days.

(21) Appl. No.: 13/477,609

(22) Filed: Sep. 4, 2012

(65) Prior Publication Data
US 2014/0068288 A1    Mar. 6, 2014

(51) Int. Cl.
| | |
|---|---|
| G06F 1/26 | (2006.01) |
| G06F 1/32 | (2006.01) |
| H02J 7/00 | (2006.01) |
| H02J 9/00 | (2006.01) |
| H04W 52/02 | (2009.01) |
| H01M 10/42 | (2006.01) |

(52) U.S. Cl.
CPC ............. *H02J 7/0063* (2013.01); *H02J 9/005* (2013.01); *H04W 52/0261* (2013.01); *H01M 10/4257* (2013.01); *H01M 2010/4271* (2013.01); *H01M 2220/30* (2013.01); *H02J 7/0031* (2013.01); *H02J 7/0045* (2013.01); *Y02B 60/50* (2013.01)

(58) Field of Classification Search
CPC .............. H01M 2010/4271; H01M 10/4257; H01M 2220/30; H02J 7/0045; H02J 7/0031
USPC ......................................................... 713/320
See application file for complete search history.

(56) References Cited

U.S. PATENT DOCUMENTS

| 2,499,663 A | 3/1950 | Medlar |
| 2,529,038 A | 11/1950 | Medlar et al. |
| 2,563,234 A | 8/1951 | Godshalk et al. |
| 2,627,060 A | 1/1953 | Berg |
| 2,637,836 A | 5/1953 | Kendall et al. |

(Continued)

FOREIGN PATENT DOCUMENTS

| DE | 10118189 | 11/2002 |
| EP | 1298809 | 4/2003 |

(Continued)

OTHER PUBLICATIONS

Patent Cooperation Treaty, International Search Report and Written Opinion of the International Searching Authority for International Application No. PCT/US2013/040242, Oct. 4, 2013, 14 pages.

(Continued)

*Primary Examiner* — Xuxing Chen
(74) *Attorney, Agent, or Firm* — Wolfe-SBMC (57) ABSTRACT

An enhanced battery saving capacity device (200) and method (300) is disclosed. In its simplest form, the method (300) includes the steps of: detecting (310) an off state by detecting a load current below a threshold; and entering (320) a battery saver mode including a duty cycle test period, by: providing a periodic test signal; disconnecting a battery for a first interval of time; and reconnecting the battery for a second interval in synchronization with the periodic test signal, to determine whether the load current exceeds the threshold. The method (300) can reduce power drain when an electronic device is off or stored for an extended period of time. It can also extend the shelf life and minimize the possibility of damage to the life cycle of a battery, by lowering the possibility of severe discharge of a battery.

22 Claims, 6 Drawing Sheets

(56) References Cited

U.S. PATENT DOCUMENTS

| | | |
|---|---|---|
| 3,678,363 A | 7/1972 | Ringle |
| 4,061,956 A | 12/1977 | Brown et al. |
| 4,082,097 A | 4/1978 | Mann et al. |
| 4,629,965 A | 12/1986 | Fallon et al. |
| 4,649,333 A | 3/1987 | Moore |
| 4,692,682 A | 9/1987 | Lane et al. |
| 4,712,055 A | 12/1987 | Houser, Jr. |
| 4,727,306 A | 2/1988 | Misak et al. |
| 4,745,349 A | 5/1988 | Palanisamy et al. |
| 5,012,176 A | 4/1991 | LaForge |
| 5,136,231 A | 8/1992 | Faulk |
| 5,166,596 A | 11/1992 | Goedken |
| 5,172,044 A | 12/1992 | Sasaki et al. |
| 5,179,335 A | 1/1993 | Nor |
| 5,185,566 A | 2/1993 | Goedken |
| 5,363,031 A | 11/1994 | Miller et al. |
| 5,481,175 A | 1/1996 | Qualich et al. |
| 5,504,416 A | 4/1996 | Holloway et al. |
| 5,523,667 A | 6/1996 | Feldstein |
| 5,640,059 A | 6/1997 | Kammiller et al. |
| 5,656,920 A | 8/1997 | Cherng et al. |
| 5,731,694 A | 3/1998 | Wilcox et al. |
| 5,736,834 A | 4/1998 | Kuno |
| 5,804,944 A | 9/1998 | Alberkrack et al. |
| 5,815,389 A | 9/1998 | Plow et al. |
| 5,900,718 A | 5/1999 | Tsenter |
| 6,094,033 A | 7/2000 | Ding et al. |
| 6,144,186 A | 11/2000 | Thandiwe et al. |
| 6,275,006 B1 | 8/2001 | Kolke et al. |
| 6,298,233 B1 | 10/2001 | Souissi |
| 6,330,455 B1 | 12/2001 | Ichihara |
| 6,470,003 B1 | 10/2002 | Smith et al. |
| 6,495,992 B1 | 12/2002 | Pavlovic |
| 6,639,462 B1 | 10/2003 | Luu |
| 6,771,051 B2 | 8/2004 | Oglesbee et al. |
| 6,803,746 B2 | 10/2004 | Aker et al. |
| 6,850,040 B2 | 2/2005 | Xiong et al. |
| 6,917,182 B2 | 7/2005 | Burton et al. |
| 6,927,555 B2 | 8/2005 | Johnson |
| 7,146,139 B2 | 12/2006 | Nevermann |
| 7,151,411 B2 | 12/2006 | Martin et al. |
| 7,158,804 B2 | 1/2007 | Kumaran et al. |
| 7,170,341 B2 | 1/2007 | Conrad et al. |
| 7,549,177 B2 | 6/2009 | Diefenbaugh et al. |
| 7,724,194 B2 | 5/2010 | Black et al. |
| 8,013,674 B2 | 9/2011 | Drogi et al. |
| 8,054,039 B2 | 11/2011 | Bauerle et al. |
| 8,155,081 B1 | 4/2012 | Mater et al. |
| 8,204,446 B2 | 6/2012 | Scheer et al. |
| 8,232,685 B2 | 7/2012 | Perper et al. |
| 8,269,467 B2 | 9/2012 | Li et al. |
| 8,278,871 B2 | 10/2012 | Kallmyer |
| 8,288,994 B2 | 10/2012 | Jakes et al. |
| 8,427,011 B2 | 4/2013 | Jung et al. |
| 8,436,492 B2 | 5/2013 | Jung et al. |
| 8,538,428 B2 | 9/2013 | Bartlett |
| 8,552,593 B2 | 10/2013 | Jung et al. |
| 8,552,693 B2 | 10/2013 | Paryani |
| 8,592,065 B2 | 11/2013 | Bhardwaj et al. |
| 8,624,546 B2 | 1/2014 | Jung et al. |
| 8,643,342 B2 | 2/2014 | Mehta et al. |
| 8,754,614 B2 | 6/2014 | Paryani et al. |
| 8,760,010 B2 | 6/2014 | Jung et al. |
| 8,805,764 B1 | 8/2014 | Rhines et al. |
| 9,246,454 B2 | 1/2016 | Schirmann et al. |
| 9,356,461 B2 | 5/2016 | Howard et al. |
| 2001/0017602 A1 | 8/2001 | Hieb |
| 2003/0085684 A1 | 5/2003 | Tsukamoto et al. |
| 2003/0189417 A1 | 10/2003 | Dias et al. |
| 2003/0228875 A1 | 12/2003 | Alapuranen |
| 2003/0228891 A1 | 12/2003 | Kobayashi et al. |
| 2004/0075494 A1 | 4/2004 | Klomsdorf et al. |
| 2004/0117330 A1 | 6/2004 | Ehlers et al. |
| 2004/0176125 A1 | 9/2004 | Lee |
| 2004/0222769 A1 | 11/2004 | Al-Anbuky et al. |
| 2004/0257040 A1 | 12/2004 | Xiong et al. |
| 2005/0017677 A1 | 1/2005 | Burton et al. |
| 2005/0030094 A1 | 2/2005 | Conrad et al. |
| 2005/0046387 A1 | 3/2005 | Aker et al. |
| 2005/0168193 A1 | 8/2005 | Xiong et al. |
| 2005/0253561 A1 | 11/2005 | Tibbs |
| 2006/0028176 A1 | 2/2006 | Tang et al. |
| 2006/0158156 A1 | 7/2006 | Gamboa |
| 2006/0269835 A1 | 11/2006 | Song |
| 2007/0069735 A1 | 3/2007 | Graf et al. |
| 2007/0188139 A1 | 8/2007 | Hussain et al. |
| 2008/0074084 A1 | 3/2008 | Lee et al. |
| 2008/0154624 A1 | 6/2008 | O'Neil |
| 2008/0197711 A1 | 8/2008 | Kato et al. |
| 2008/0211455 A1 | 9/2008 | Park et al. |
| 2008/0303480 A1 | 12/2008 | Prutchi et al. |
| 2009/0102294 A1 | 4/2009 | Hodges et al. |
| 2009/0131074 A1 | 5/2009 | Minier |
| 2009/0206797 A1 | 8/2009 | Chueh et al. |
| 2009/0295226 A1 | 12/2009 | Hodges et al. |
| 2010/0033138 A1 | 2/2010 | Alger et al. |
| 2010/0085010 A1* | 4/2010 | Suzuki et al. .................. 320/132 |
| 2010/0127666 A1 | 5/2010 | Ball |
| 2010/0127889 A1 | 5/2010 | Vogel et al. |
| 2010/0156355 A1 | 6/2010 | Bauerle et al. |
| 2010/0198423 A1 | 8/2010 | Hirst |
| 2010/0198713 A1 | 8/2010 | Forbes et al. |
| 2010/0233989 A1 | 9/2010 | Constien et al. |
| 2010/0266066 A1 | 10/2010 | Takahashi |
| 2010/0283691 A1 | 11/2010 | Su et al. |
| 2011/0012562 A1 | 1/2011 | Paryani |
| 2011/0018346 A1 | 1/2011 | Dixon |
| 2011/0037439 A1 | 2/2011 | Bhardwaj et al. |
| 2011/0070848 A1 | 3/2011 | Reddy |
| 2011/0071597 A1 | 3/2011 | Aghassian |
| 2011/0090126 A1 | 4/2011 | Szini et al. |
| 2011/0119005 A1 | 5/2011 | Majima et al. |
| 2011/0121836 A1* | 5/2011 | Kim et al. ...................... 324/433 |
| 2011/0140538 A1 | 6/2011 | Jung et al. |
| 2011/0151942 A1 | 6/2011 | Hanley et al. |
| 2011/0156661 A1 | 6/2011 | Mehta et al. |
| 2011/0222469 A1 | 9/2011 | Ali et al. |
| 2011/0275369 A1 | 11/2011 | Bartlett et al. |
| 2011/0291619 A1 | 12/2011 | Asakura |
| 2011/0316475 A1 | 12/2011 | Jung et al. |
| 2012/0021800 A1 | 1/2012 | Wilson et al. |
| 2012/0032646 A1* | 2/2012 | Lee ....................... H02J 7/0031 320/135 |
| 2012/0071195 A1 | 3/2012 | Chakraborty et al. |
| 2012/0146576 A1 | 6/2012 | Partovi |
| 2012/0147801 A1 | 6/2012 | Ho et al. |
| 2012/0210325 A1 | 8/2012 | de Lind van Wijngaarden et al. |
| 2012/0213172 A1 | 8/2012 | Kim et al. |
| 2012/0235636 A1 | 9/2012 | Partovi |
| 2012/0242906 A1 | 9/2012 | Shintani et al. |
| 2013/0020862 A1 | 1/2013 | Miller |
| 2013/0121194 A1 | 5/2013 | Heshmati |
| 2013/0122827 A1 | 5/2013 | Ali et al. |
| 2013/0169348 A1 | 7/2013 | Shi |
| 2013/0237254 A1 | 9/2013 | Papakipos et al. |
| 2013/0249479 A1 | 9/2013 | Partovi |
| 2013/0257359 A1 | 10/2013 | Sakai et al. |
| 2014/0070761 A1 | 3/2014 | Labbe et al. |
| 2014/0070762 A1 | 3/2014 | Jenwatanavet et al. |
| 2014/0084856 A1 | 3/2014 | Howard et al. |
| 2014/0092243 A1 | 4/2014 | Ichikawa |
| 2014/0097671 A1 | 4/2014 | Nakamura et al. |
| 2014/0176067 A1 | 6/2014 | Suzuki et al. |
| 2014/0232330 A1 | 8/2014 | Robertson et al. |
| 2014/0253023 A1 | 9/2014 | Paryani |
| 2014/0266462 A1 | 9/2014 | Schirmann et al. |
| 2014/0274188 A1 | 9/2014 | Thorson et al. |
| 2015/0064528 A1 | 3/2015 | Liu et al. |
| 2015/0234054 A1 | 8/2015 | Lennen et al. |
| 2015/0349372 A1 | 12/2015 | Maleki et al. |
| 2015/0379533 A1 | 12/2015 | Alberth et al. |

(56) References Cited

U.S. PATENT DOCUMENTS

| | | | |
|---|---|---|---|
| 2016/0043752 | A1 | 2/2016 | Slater et al. |
| 2016/0072326 | A1 | 3/2016 | Nilles |

FOREIGN PATENT DOCUMENTS

| | | |
|---|---|---|
| EP | 1505725 | 7/2009 |
| EP | 2077682 | 7/2009 |
| EP | 2222371 | 5/2011 |
| EP | 2595269 | 5/2013 |
| JP | H09247852 A | 9/1997 |
| JP | 2003333200 | 11/2003 |
| WO | 9306682 A1 | 4/1993 |
| WO | WO-2011084367 | 7/2011 |
| WO | WO-2011090769 | 7/2011 |
| WO | WO-2013152149 | 10/2013 |

OTHER PUBLICATIONS

"International Preliminary Report on Patentability", Application No. PCT/US2013/042042, Mar. 10, 2015, 8 pages.
"3GTPP TS 36.213 V9.3.0 3rd Generation Partnership Project Technical Specification Group Radio Access Network", Evolved Universal Terrestrial Radio Access (E-UTRA); Physical layer procedures (Release 9), Sep. 2010, 80 pages.
"Ex Parte Quayle Action", U.S. Appl. No. 13/625,976, Dec. 11, 2015, 11 pages.
"Ex Parte Quayle Action", U.S. Appl. No. 14/108,544, Apr. 23, 2015, 8 pages.
"Ex Parte Quayle Action", U.S. Appl. No. 14/451,950, Aug. 4, 2015, 7 pages.
"Final Office Action", U.S. Appl. No. 13/625,976, Jun. 5, 2015, 40 pages.
"Final Office Action", U.S. Appl. No. 13/798,682, Jul. 30, 2015, 12 pages.
"Final Office Action", U.S. Appl. No. 14/457,190, Mar. 3, 2016, 33 pages.
"First Choice Power", http://www.firstchoicepower.com/plans-services/electricity-plans/variable-rate-electricity-plans.aspx—Retrieved on May 18, 2012, 1 page.
"How Does Prepaid Electricity Work", http://www.mxenergy.com/does-prepaid-electricity-work-a-19.html—Retrieved on Jan. 15, 2012, 3 pages.
"International Preliminary Report on Patentability", Application No. PCT/US2013/054623, Apr. 9, 2015, 12 pages.
"International Preliminary Report on Patentability", Application No. PCT/US2013/060170, Mar. 24, 2015, 6 pages.
"International Preliminary Report on Patentability", Application No. PCT/US2014/014994, Sep. 15, 2015, 8 pages.
"International Search Report and Written Opinion", Application No. PCT/US2014/070384, Mar. 13, 2015, 12 pages.
"International Search Report and Written Opinion", Application No. PCT/US2014/014994, Mar. 21, 2014, 12 pages.
"International Search Report and Written Opinion", Application No. PCT/US2013/054623, May 14, 2014, 14 pages.
"International Search Report and Written Opinion", Application No. PCT/US2014/018479, Jul. 22, 2014, 17 pages.
"International Search Report and Written Opinion", Application No. PCT/US2013/060170, Dec. 5, 2013, 8 pages.
"Non-Final Office Action", U.S. Appl. No. 13/621,857, Nov. 14, 2014, 5 pages.
"Non-Final Office Action", U.S. Appl. No. 13/625,976, Feb. 5, 2015, 38 pages.
"Non-Final Office Action", U.S. Appl. No. 13/798,682, Feb. 17, 2015, 10 pages.
"Non-Final Office Action", U.S. Appl. No. 13/798,682, Dec. 4, 2015, 13 pages.
"Non-Final Office Action", U.S. Appl. No. 14/457,190, Sep. 18, 2015, 25 pages.
"Notice of Allowance", U.S. Appl. No. 13/621,857, Jan. 26, 2015, 7 pages.
"Notice of Allowance", U.S. Appl. No. 13/621,857, May 11, 2015, 5 pages.
"Notice of Allowance", U.S. Appl. No. 13/625,976, Mar. 3, 2016, 8 pages.
"Notice of Allowance", U.S. Appl. No. 14/108,544, Oct. 15, 2015, 6 pages.
"Notice of Allowance", U.S. Appl. No. 14/451,950, Jan. 15, 2016, 5 pages.
"Restriction Requirement", U.S. Appl. No. 13/621,857, Aug. 18, 2014, 7 pages.
"Supplemental Notice of Allowance", U.S. Appl. No. 14/451,950, Jan. 29, 2016, 2 pages.
"Your Choice Your Plan", GreyStone Power Corporation, http://www.greystonepower.com/UploadedFiles/pdf/prepaid%20brochure.pdf—Retrieved on Jun. 4, 2012, 2 pages.
Park, "Energy Maps for Large-scale, Mobile Wireless Networks", IEEE International Conference on Communications, 2007, Jun. 24, 2007, 6 pages.
"Corrected Notice of Allowance", U.S. Appl. No. 13/625,976, May 4, 2016, 2 pages.
"Non-Final Office Action", U.S. Appl. No. 14/293,182, May 20, 2016, 10 pages.
"Notice of Allowance", U.S. Appl. No. 14/451,950, Apr. 22, 2016, 5 pages.
"Supplemental Notice of Allowance", U.S. Appl. No. 13/625,976, Mar. 24, 2016, 5 pages.

* cited by examiner

METHOD AND DEVICE WITH ENHANCED BATTERY CAPACITY SAVINGS

BACKGROUND

1. Field

The present disclosure relates to a method and device with enhanced battery capacity savings.

2. Introduction

Electronic devices are generally moving to embedded batteries. The shelf life of batteries installed in these devices can present a problem, in the event a battery is severely discharged. When a battery becomes severely discharged, its useful life and capacity can be shortened.

A method and device that addresses this potential problem and others like it, would be considered an improvement in the art.

BRIEF DESCRIPTION OF THE DRAWINGS

In order to describe the manner in which the above-recited and other advantages and features of the disclosure can be obtained, a more particular description of the disclosure briefly described above will be rendered by reference to specific embodiments thereof which are illustrated in the appended drawings. Understanding that these drawings depict only typical embodiments of the disclosure and are not therefore to be considered to be limiting of its scope, the disclosure will be described and explained with additional specificity and detail through the use of the accompanying drawings in which.

DETAILED DESCRIPTION

Figure 1:
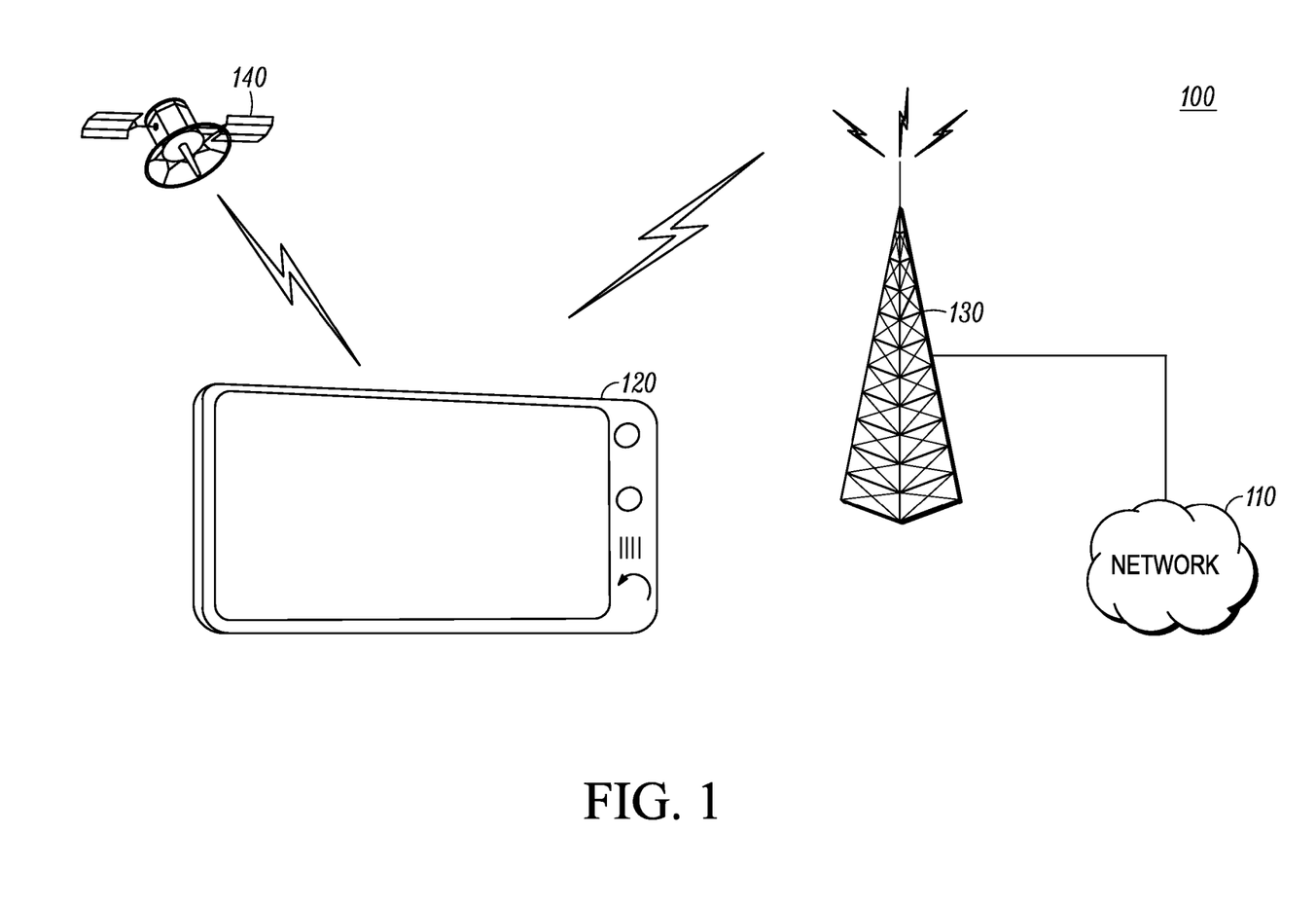
FIG. 1 is an exemplary block diagram of a communication system according to one embodiment.
Figure 2:
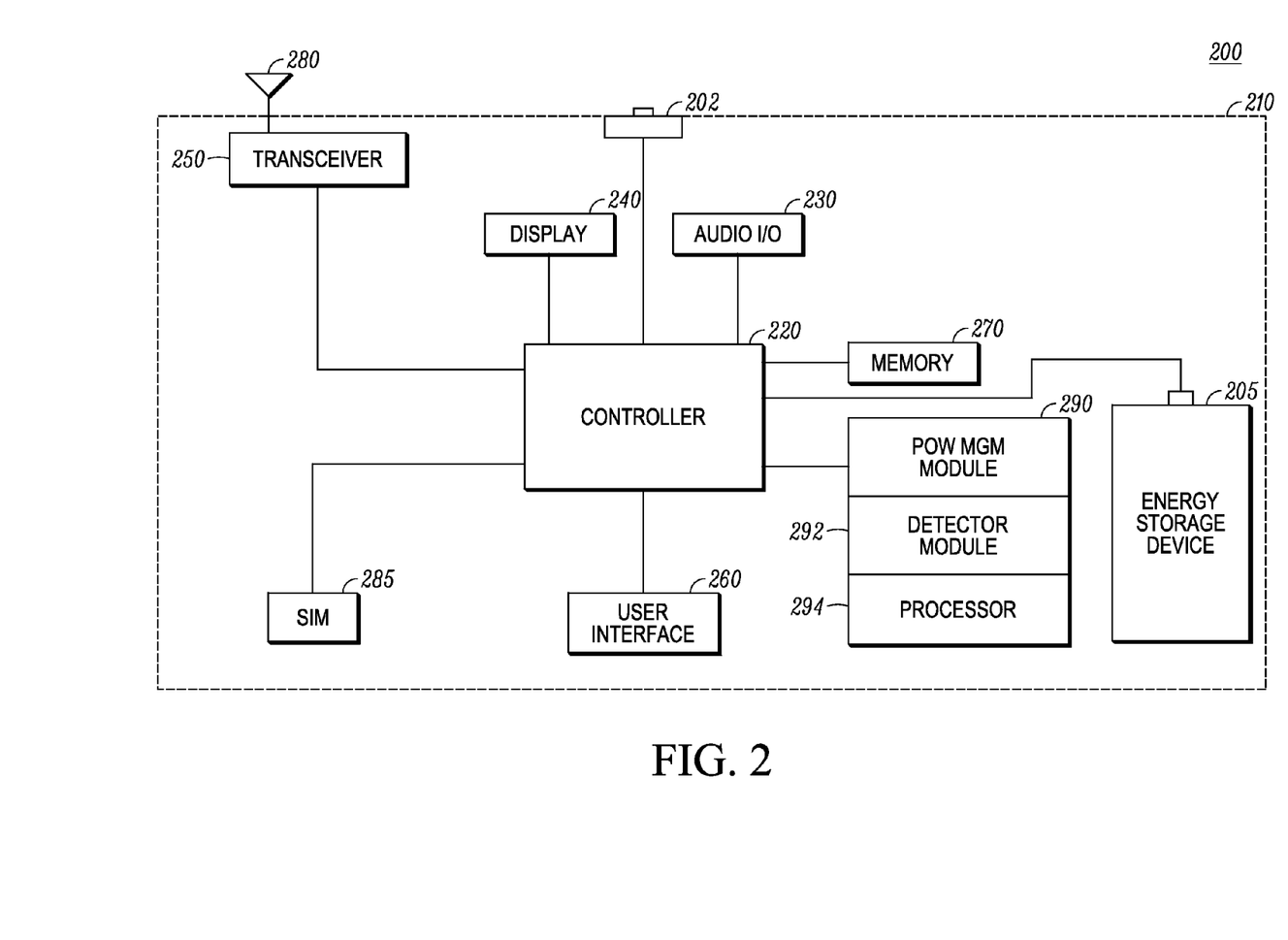
FIG. 2 is an exemplary block diagram of an electronic device according to one embodiment.

FIG. 1 is an exemplary block diagram of a system 100 according to one embodiment. The system 100 can include a network 110, a terminal 120, and a base station 130. The terminal 120 may be a host, electronic device or wireless communication device, such as a wireless telephone, a wearable device, a cellular telephone, a personal digital assistant, a pager, a personal computer, a tablet, a selective call receiver, or any other device that is capable of sending and receiving communication signals on a network including a wireless network. The network 110 may include any type of network that is capable of sending and receiving signals, such as wireless signals. For example, the network 110 may include a wireless telecommunications network, a cellular telephone network, a Time Division Multiple Access (TDMA) network, a Code Division Multiple Access (CDMA) network, Global System for Mobile Communications (GSM), a Third Generation (3G) network, a Fourth Generation (4G) network, a satellite communications network, and other like communications systems. More generally, network 110 may include a Wide Area Network (WAN), a Local Area Network (LAN) and/or a Personal Area Network (PAN). Furthermore, the network 110 may include more than one network and may include a plurality of different types of networks. Thus, the network 110 may include a plurality of data networks, a plurality of telecommunications networks, a combination of data and telecommunications networks and other like communication systems capable of sending and receiving communication signals. In operation, the terminal 120 can include a wireless communication device which can communicate with the network 110 and with other devices on the network 110 by sending and receiving wireless signals via the base station 130, which may also comprise local area, and/or personal area access points, as detailed more fully herein. The terminal 120 is shown being in communication with a global positioning system (GPS) 140 satellite, global navigation satellite system (GNSS) or the like, for position sensing and determination. FIG. 2 is an exemplary block diagram of an electronic device 200, such as a wireless communication device configured with an energy storage device, battery or module 205, such as in the terminal 120, for example. The wireless communication device 200 can include a housing 210, a controller 220 coupled to the housing 210, audio input and output circuitry 230 coupled to the housing 210, a display 240 coupled to the housing 210, a transceiver 250 coupled to the housing 210, a user interface 260 coupled to the housing 210, a memory 270 coupled to the housing 210, an antenna 280 coupled to the housing 210 and the transceiver 250, and a removable subscriber module 285 coupled to the controller 220.

Figure 4:
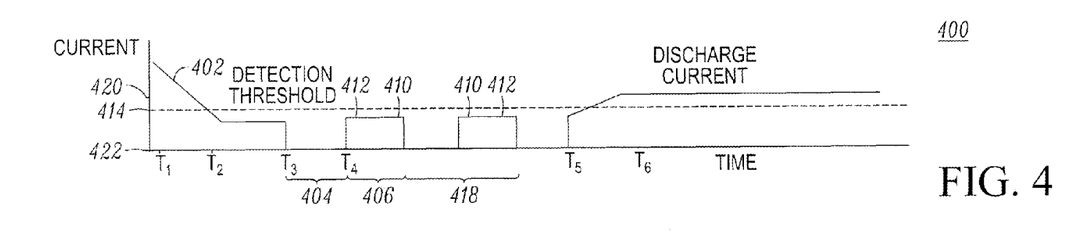
FIG. 4 is an exemplary graph with discharge current plotted along a vertical axis and time along a horizontal axis, with a threshold current shown in dashed line according to one embodiment.

As shown in FIG. 2, the device 200 further includes a power management module 290 including a detector module 292 and processor 294. The detector module 292 can detect a host off state by recognizing discharge current of less than a certain threshold, as shown in FIG. 4. At this time, the detector module 292 determines the host is in the off state and disconnects the battery for a period of time. At the completion of this time interval, the battery is reconnected for a second period to search for a power on sequence to which the discharge current would exceed the threshold. When this occurs, a power on sequence would occur, as provided in more detail herein.

In one embodiment, the module 290 can reside within in the controller 220, can reside within the memory 270, can reside in an energy storage device 205 module, can be an autonomous module, can be software, can be hardware, or can be in any other format useful for a module used with a host, such as device 200.

The display 240 can be a liquid crystal display (LCD), a light emitting diode (LED) display, a plasma display, a touch screen display or any other means for displaying information. The transceiver 250 may include a transmitter and/or a receiver. The audio input and output circuitry 230 can include a microphone, a speaker, a transducer, or any other audio input and output circuitry. The user interface 260 can include a keypad, buttons, a touch screen or pad, a joystick, an additional display, or any other device useful for providing an interface between a user and an electronic device. The memory 270 may include a random access memory, a read only memory, an optical memory or any other memory that can be coupled to a wireless communication device.

Figure 3:
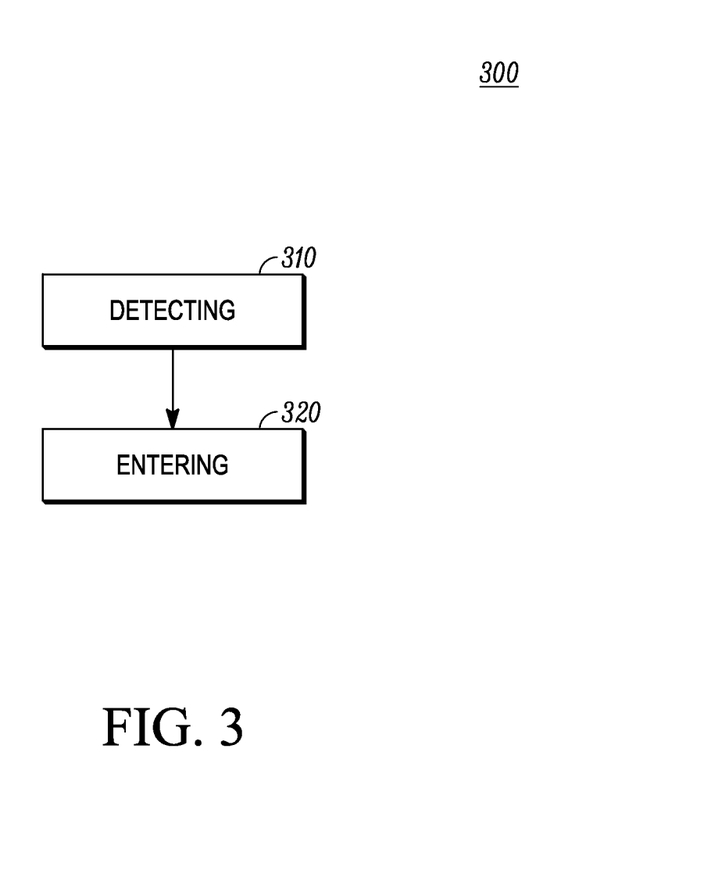
FIG. 3 is an exemplary block diagram of a method according to one embodiment.

A block diagram of an enhanced battery saving capacity method is shown in FIG. 3. In its simplest form, the method 300 includes the steps of: detecting 310 an off state by detecting a load current below a threshold; and entering 320 a battery saver mode including a duty cycle test period, by: providing a periodic test signal; disconnecting a battery for a first interval of time; and reconnecting the battery for a second interval in synchronization with the periodic test signal, to determine whether the load current exceeds the threshold. The method 300 can reduce power drain when an electronic device is off or on a shelf for an extended period of time. It can also extend the shelf life and minimize the possibility of damage to the life cycle of a battery, by lowering the possibility of severe discharge of a battery.

The method 300 can include exiting the battery saver mode in the event the load current exceeds the threshold. For example, when a user activates a power on sequence, the load current exceeds the threshold and the battery saver mode is exited. In one embodiment, the entering step 320 of the battery saving mode can be initiated as a result of an electronic device being turned to the off state or after a predetermined period of time. Stated differently, a recovery function can be enabled, such as when a power button is actuated for a certain period of time to allow actuation to be detected, and the low power function disabled and a host would power up.

Thus, in one case, a delay can be provided before initiating the battery saving mode, so a user does not have to depress the on button for a long period of time. Thus, gating after a certain period of time, can provide for a better consumer experience. For example, entering the battery saving mode could be delayed for at least one hour and preferably 10 hours.

In connection with the entering step 320, the first interval is free from having a signal and the second interval is generally a half square wave or strobe pulse, as detailed below. Accordingly, during the first interval a host is not connected to a battery by way of an open switch configuration, such as an FET. And, during the second interval, a host is connected to a battery via a switch in a closed position.

In a preferred embodiment, the periodic test signal of the second interval is sampled after an in rush period. Sampling at this time, allows the signal to adjust to a proper level, during the battery saving mode.

In one embodiment, the first interval is longer than the test signal of the second interval. The longer the disconnection or distance between test signals, the greater the power savings in this embodiment. In a preferred embodiment, the periodic test signal includes a frequency range that is low enough to help minimize power drain and high enough to minimize latency when the energy saver mode is exited.

In connection with the entering step 320, the duty cycle test period includes a plurality of first intervals and second intervals, to determine whether the load current exceeds the threshold during the second interval.

Also, in connection with the entering step 320, the periodic test signal includes a signal below the threshold during the reconnecting step, to determine whether the load current exceeds the threshold.

And in connection with the entering step 320, the threshold is strategically selected to be below an on state current level and above an off state current level, as shown in FIG. 4.

In another embodiment, an enhanced battery saving capacity device 200 is shown in FIG. 2. The device 200 can include: an electronic device 200 including an actuator 202 and a battery 205; a controller 220 coupled to the electronic device 200, the controller 220 configured to control the operations of the electronic device; and a power management module 290 configured to detect an off state by detecting a load current below a threshold and enter a battery saver mode including a duty cycle test period, the battery save mode configured to: provide a periodic test signal; disconnect a battery for a first interval of time; and reconnect the battery for a second interval in synchronization with the periodic test signal, to determine whether the load current exceeds the threshold.

In one embodiment, in the event a discharge current of a host is detected below a threshold via detector module 292, for a certain period of time the processor 294 can enter into a battery saver mode including a strobe for pulsing on and off until recovery current from a host is detected, as shown in FIG. 4, for example.

In connection with electronic devices, such as in wireless communication devices, with embedded batteries, battery shelf life capacity issues can present a problem and can damage battery capacities. Advantageously, providing a test signal or strobing function, when a host is detected to be in an off state, that disconnects the battery from the host, can improve battery shelf life and battery life.

The power management module 290 can be configured to enter the battery saving mode upon the actuator 202 being actuated to the off state or when a discharge current dips below a threshold. The power management module 290 can also be configured to exit the battery saver mode in the event the load current exceeds the threshold, by using the detector module 292, for example, as detailed in connection with FIG. 4.

In one case, the power management module 290 can be configured to enter the battery saving mode after a predetermined period of time after the actuator is placed in the off state. This feature can provide a delay before initiating the battery saving mode, so a user does not have to depress an on button for a long period of time or for the entire work cycle. For example, the battery saving mode could be delayed for at least an hour, and preferably at least 10 hours.

FIG. 4 is an exemplary graph 400 with discharge current plotted along a vertical axis and time along a horizontal axis, with a threshold current shown in dashed line. Inrush current is omitted for simplicity. As illustrated in FIG. 4, a current signal 402 is plotted along time. The signal 402 includes a first interval 404 (non-pulse portion) which is free from having a signal and the second interval 406, which could take the shape of a square wave. The signal 402 includes a periodic test signal 412, which has a magnitude below the threshold 414. At T1 a host is deactivated. At T2, the signal 402 is decreasing and is at the threshold. At T3, the first interval 404 begins. At T4, the second interval 406 begins. A second period is shown at 418, with a first and second interval. At T5, a host is activated and the threshold 414 is exceeded at T6. Once the threshold 414 is exceeded at T6, by for example, a user activating a power on sequence, the battery saver mode is exited and the host becomes operational.

In FIG. 4, the threshold 414 is below an on state 420 current level for a host and above an off state 422 current level of the host.

Figures 5, 6:
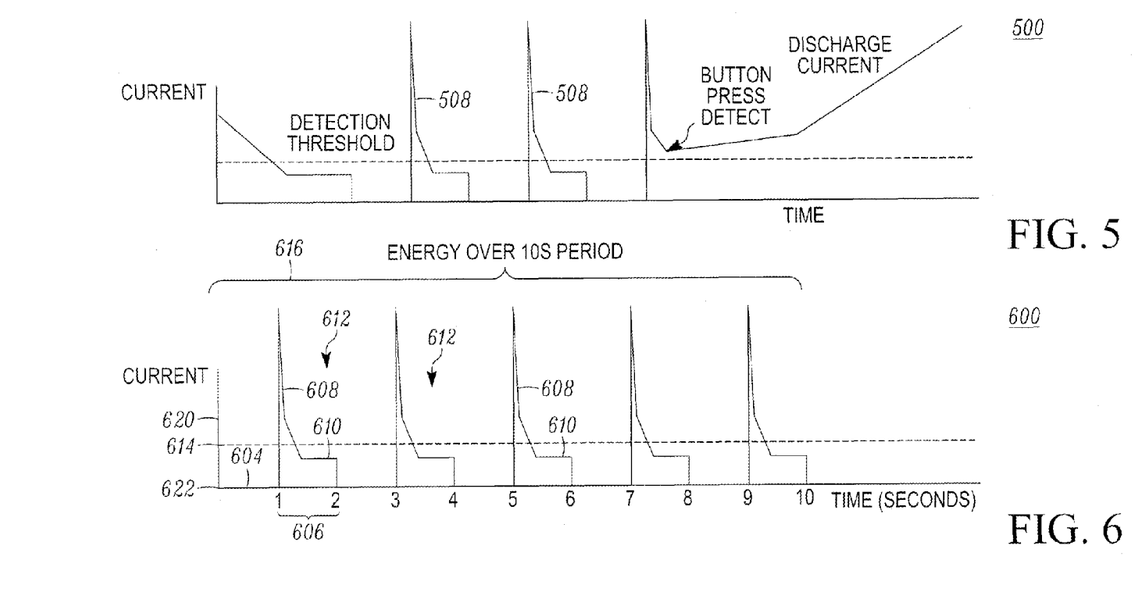
FIG. 5 is an exemplary graph relating to startup energy, with discharge current plotted along a vertical axis and time along a horizontal axis, with a threshold current shown in dashed line according to one embodiment.
FIG. 6 is an exemplary graph relating to an example with a two second period, with discharge current plotted along a vertical axis and time along a horizontal axis, with a threshold current shown in dashed line according to one embodiment.

In one embodiment, as shown in FIG. 6, the periodic test signal 612 of the second interval 606 is sampled after an in rush period 608 of the periodic test signal 612. This provides time for the signal to be at a flat level 610 for stable and accurate sampling, below the threshold 614.

Figure 7:
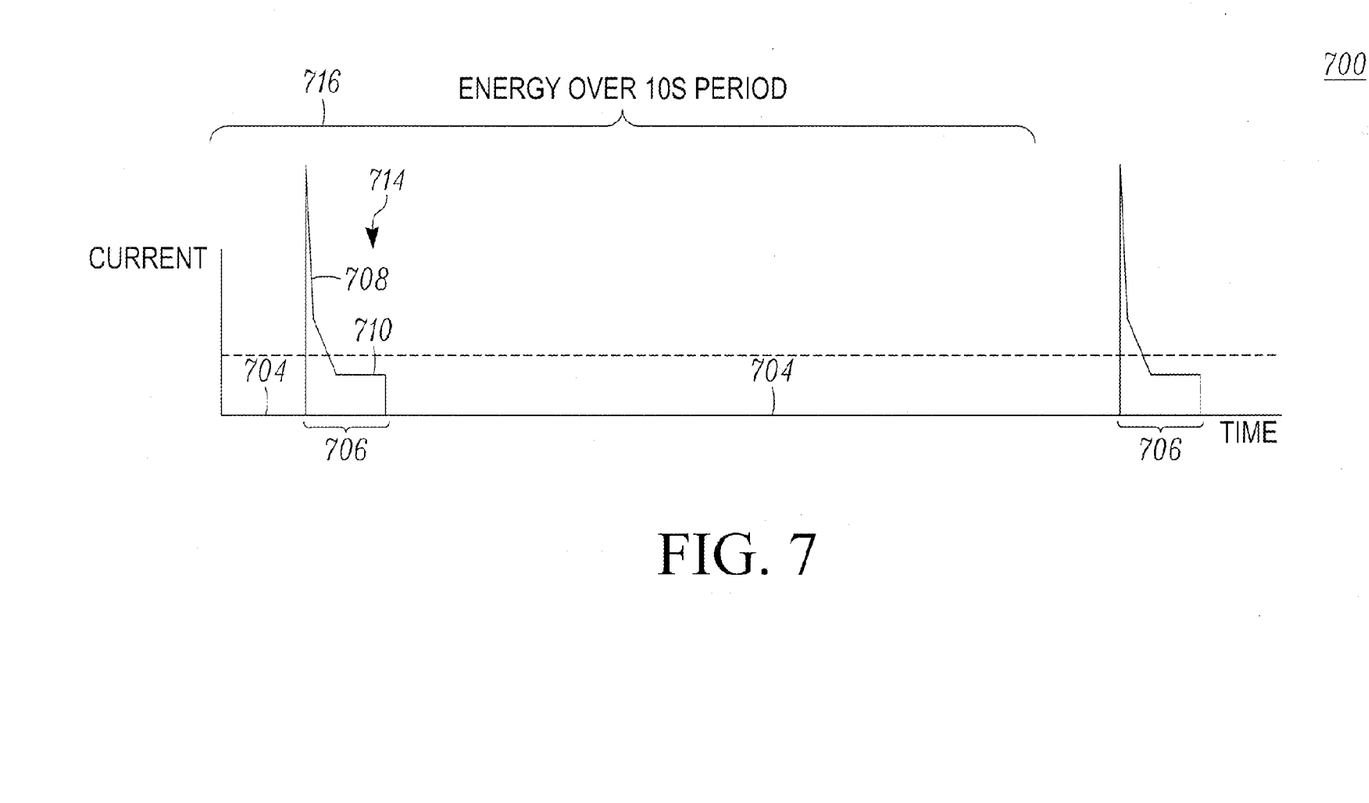
FIG. 7 is an exemplary graph relating to an example with a ten second period, with discharge current plotted along a vertical axis and time along a horizontal axis, with a threshold current shown in dashed line according to one embodiment.

In a preferred embodiment, the first interval 704 (non-pulse portion) is longer than the test signal 714 portion of the second interval 706, as best shown in FIG. 7.

Advantageously, the longer the disconnection, the lower the power consumption.

As best shown in FIG. 6, the duty cycle test period 616 includes a plurality of first intervals 604 and second intervals 606 comprising a signal train. As what commonly occurs in engineering solutions, often compromises have to be made. The more test signals 612, the faster the host can return to the on state, when appropriate. However, the longer the first intervals 604 or less test signals 612 during the duty cycle 616, the lower the power consumption, but the slower the return to the on state when the host is actuated. Stated differently, as shown in FIGS. 4-6, the periodic test signal 612 includes a signal magnitude below the threshold 614. In a preferred embodiment, the threshold 614 is below an on state 620 current level for a host and above an off state 622 current level of the host.

Comparative Example A

FIG. 5 is an exemplary graph relating to startup energy, with discharge current plotted along a vertical axis and time along a horizontal axis, with a threshold current shown in dashed line. Referring to FIG. 5, Comparative Example A provides startup energy information and a base line to compare from. Startup energy is a function of how long the power has been disconnected to the host, and in this example a phone. This test was performed using a Droid 3 phone. The battery standby current, that is the battery FETS on and phone off, resulted in ~155 uA. In rush current 508 was observed for ~330 uS. For a 10 second duty cycle (1 second on and 9 seconds off), in rush current peaked at ~2 A. For a 2 second duty cycle (1 second on and 1 second off, in rush current peaked at about 1.3 A.

Example 1

FIG. 6 is an exemplary graph relating to an example with a two second period, with discharge current plotted along a vertical axis and time along a horizontal axis, with a threshold current shown in dashed line. The graph 600 is shown with a ten second duty cycle.

Referring to FIG. 6, Example 1 provides information for a two second period. 1 second on sample and one second off over a 10 second period. Energy of Inrush=1.3 A*330 us/2=215 uA-S. Balance of sample=155 uA*0.99967=155 uA-S. Total of one pulse=370 ua-S. Times 5 for a 10 second period–1.85 mA for 10 seconds.

Average per second=185 uA-S.

Compare this to continuous of 155 uA-S, in Comparative Example A. No benefit.

Example 2

FIG. 7 is an exemplary graph relating to an example with a ten second period (duty cycle), with discharge current plotted along a vertical axis and time along a horizontal axis, with a threshold current shown in dashed line.

Referring to FIG. 7, Example 2 provides information for a ten second period. In this example, a 1 second sample time over 10 second period was performed. Energy of Inrush=~2 A*330 us/2=330 uA-S. Balance of sample=155 uA*0.99967=155 uA-S. Total of one pulse=485 uA-S. Times 1 for 10 second period–485 uA for 10 seconds. Average per second=48.5 uA-S. This is a significant improvement over continuous of 155 uA-S, in Comparative Example A.

Figure 8:
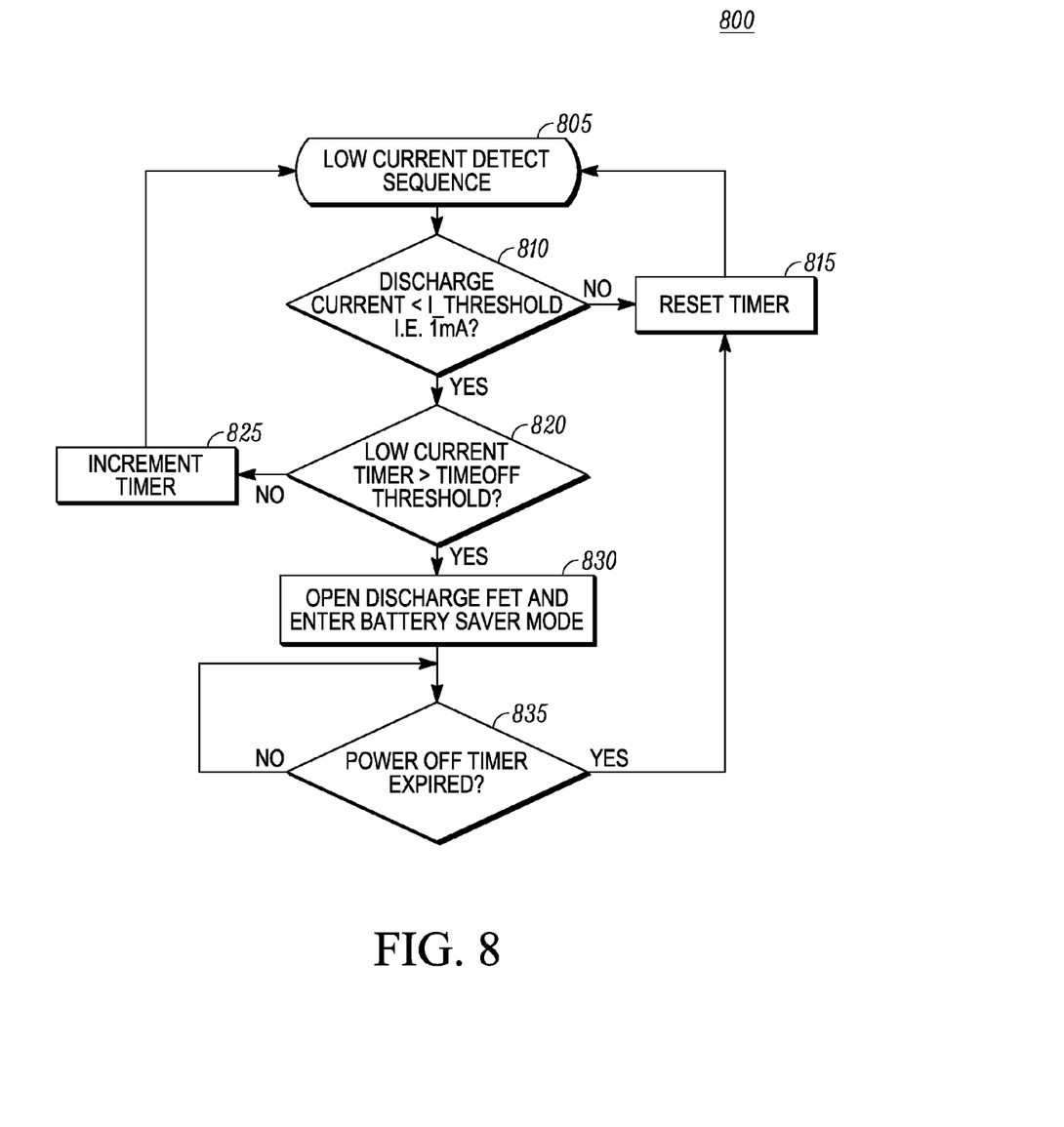
FIG. 8 is an exemplary flow chart relating to a method according to one embodiment.

Referring to FIG. 8, an exemplary flow chart 800 is shown. A low current detect sequence begins at 805. At decision diamond 810, the question is, is discharge current less than a threshold. If no, a timer is reset at box 815 and then the path returns to begin the low current detect sequence 805. If yes, a decision diamond 820 is reached, and the question is, is the low current timer less than a timeoff threshold. If no, a timer is incremented in box 825 and then the path returns to the low current detect sequence 805. If yes, a switch, such as an FET is opened and the power management module 290, enters the energy saver mode at box 830. Next, a decision diamond 835 is reached, and the question is has the power off timer expired. If yes, a reset timer 815 is actuated and then the path returns to the low current detect sequence 805. If no, the path recycles to the decision diamond 835. Advantageously, this configuration can help to enhance the life of a battery, as previously detailed.

It should be noted, that the power management module 290 and energy storage device 205, as detailed herein, can be integrated in a stand alone module, and can be easily connected to a host.

The devices 120 and 200 and methods 300 and 800 are preferably implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, the preferred embodiments of the disclosure as set forth herein are intended to be illustrative, not limiting. Various changes may be made without departing from the spirit and scope of the disclosure. In this document, relational terms such as "first," "second," and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

We claim:

1. An enhanced battery saving method of an electronic device including a battery, the method comprising:
   detecting an off state of a host associated with the electronic device by detecting a load current below a threshold while the electronic device is not connected to an external power source; and
   entering a battery saver mode including a duty cycle test period having a plurality of first time intervals and a plurality of second time intervals, by:
      providing a periodic test signal;
      disconnecting the battery from the host for a first interval of time of the plurality of first time intervals; and
      reconnecting the battery to the host for a second interval of time of the plurality of second time intervals in synchronization with the periodic test signal to determine whether the load current exceeds the threshold.

2. The battery saving method of claim 1, further comprising exiting the battery saver mode in the event the load current exceeds the threshold.

3. The battery saving method of claim 1, wherein the entering of the battery saver mode is initiated as a result of the electronic device being turned to the off state.

4. The battery saving method of claim 1, wherein the entering of the battery saver mode is initiated after a predetermined period of time.

5. The battery saving method of claim 1, wherein the first interval of time is free from having a signal and the second interval of time is generally a current waveform less than the threshold.

6. The battery saving method of claim 1, wherein the periodic test signal of the second interval of time is sampled after an inrush period.

7. The battery saving method of claim 1, wherein the first interval of time is longer than the test signal of the second interval of time.

8. The battery saving method of claim 1, wherein the periodic test signal comprises a frequency range configured to:
   reduce a power drain of the battery; and
   minimize a power on sequence latency when the battery saver mode is exited for the frequency range associated with reducing the power drain.

9. The battery saving method of claim 1, wherein the periodic test signal includes a signal below the threshold.

10. The battery saving method of claim 1, wherein the threshold is below an on state level current level and above an off state current level.

11. The battery saving method of claim 1, wherein the duty cycle test period is based off of a ten-second duty cycle and the periodic test signal operates at a duty cycle having rate based off of 10% of the duty cycle test period.

12. An enhanced battery saving device comprising:
   an electronic device including an actuator and a battery;
   a controller coupled to the electronic device, the controller configured to control the operations of the electronic device; and
   a power management module configured to detect an off state of the electronic device by detecting a load current below a threshold and enter a battery saver mode including a duty cycle test period having a plurality of first time intervals and a plurality of second time intervals, while the electronic device is not connected to an external power source, the battery saver mode configured to:
      provide a periodic test signal;
      disconnect a battery from the electronic device for a first interval of time of the plurality of first time intervals; and
      reconnect the battery to the electronic device for a second interval of time of the plurality of second time intervals in synchronization with the periodic test signal to determine whether the load current exceeds the threshold.

13. The enhanced battery saving device of claim 12, wherein the power management module is configured to exit the battery saver mode in the event the load current exceeds the threshold.

14. The enhanced battery saving device of claim 12, wherein the power management module is configured to enter the battery saver mode upon the actuator being actuated to the off state.

15. The enhanced battery saving device of claim 12, wherein the power management module is configured to enter the battery saver mode after a predetermined period of time after the actuator is placed in the off state.

16. The enhanced battery saving device of claim 12, wherein the first interval of time is free from having a signal and the second interval of time is generally a current waveform less than the threshold.

17. The enhanced battery saving device of claim 12, wherein the periodic test signal of the second interval of time is sampled after an inrush period.

18. The enhanced battery saving device of claim 12, wherein the first interval of time is longer than the test signal of the second interval of time.

19. The enhanced battery saving device of claim 12, wherein the periodic test signal comprises a frequency range configured to:
   reduce a power drain associated with the battery; and
   minimize a power on sequence latency when the battery saver mode is exited for the frequency range associated with reducing the power drain.

20. The enhanced battery saving device of claim 12, wherein the periodic test signal includes a signal below the threshold.

21. The enhanced battery saving device of claim 12, wherein the threshold is below an on state level current level and above an off state current level.

22. The enhanced battery saving device of claim 12, wherein the duty cycle test period is based off of a ten-second duty cycle and the periodic test signal operates at a duty cycle having a rate based off of 10% of the duty cycle test period.

* * * * *